United States Patent
Blangero et al.

(10) Patent No.: US 11,909,044 B2
(45) Date of Patent: Feb. 20, 2024

(54) PRECURSOR OF A POSITIVE ELECTRODE MATERIAL FOR A RECHARGEABLE LITHIUM-ION BATTERY

(71) Applicants: UMICORE, Brussels (BE); UMICORE KOREA LTD., Cheonan-si (KR)

(72) Inventors: Maxime Blangero, Cheonan-si (KR); Liang Zhu, Olen (BE); YuRi Lee, Cheonan-si (KR); Kris Driesen, Olen (BE)

(73) Assignees: Umicore, Brussels (BE); Umicore Korea Ltd., Cheonan-si (KR)

( * ) Notice: Subject to any disclaimer, the term of this patent is extended or adjusted under 35 U.S.C. 154(b) by 77 days.

(21) Appl. No.: 17/287,148

(22) PCT Filed: Oct. 23, 2019

(86) PCT No.: PCT/EP2019/078860
§ 371 (c)(1),
(2) Date: Apr. 21, 2021

(87) PCT Pub. No.: WO2020/083980
PCT Pub. Date: Apr. 30, 2020

(65) Prior Publication Data
US 2021/0391574 A1  Dec. 16, 2021

(30) Foreign Application Priority Data
Oct. 24, 2018 (EP) ..................... 18202213

(51) Int. Cl.
*H01M 4/525* (2010.01)
*H01M 4/505* (2010.01)
*H01M 10/0525* (2010.01)
*C01G 53/00* (2006.01)
*H01M 4/02* (2006.01)

(52) U.S. Cl.
CPC ............ *H01M 4/525* (2013.01); *C01G 53/50* (2013.01); *H01M 4/505* (2013.01); *C01P 2002/52* (2013.01); *C01P 2004/84* (2013.01); *C01P 2006/40* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 2013/0202966 A1 | 8/2013 | Yu et al. |
| 2016/0276664 A1 | 9/2016 | Gunji et al. |
| 2017/0317344 A1 | 11/2017 | Tan et al. |
| 2018/0233740 A1 | 8/2018 | You et al. |

FOREIGN PATENT DOCUMENTS

| | | |
|---|---|---|
| JP | 2017154916 A | 9/2017 |
| JP | 2018523899 A | 8/2018 |

OTHER PUBLICATIONS

ISA/EP; International Search Report and Written Opinion for International Patent Application No. PCT/EP2019/078860 dated Jan. 14, 2020, 8 pages.
WIPO; International Preliminary Report on Patentability for International Patent Application No. PCT/EP2019/078860 dated Nov. 3, 2020, 10 pages.
Manthiram, A., et al., "A perspective on nickel-rich layered oxide cathodes for lithium-ion batteries", Energy Storage Materials, Elsevier, vol. 6, Jan. 2017, 15 pages.
Zhang, Yongheng, et al., "Facile synthesis of a novel structured Li[Ni0.66Co0.1Mn0.24]O2 cathode material with improved cycle life and thermal stability via ion diffusion", Journal of Power Sources, Elsevier, vol. 327, Jul. 11, 2016, 6 pages.
USPTO; Non-Final Action for U.S. Appl. No. 17/236,058 dated Oct. 25, 2023, 13 pages.

*Primary Examiner* — Tanisha Diggs
(74) *Attorney, Agent, or Firm* — NK Patent Law

(57) ABSTRACT

A precursor compound for manufacturing a lithium transition metal based oxide powder usable as an active positive electrode material in lithium-ion batteries, the precursor being either one of a metal-bearing M'-hydroxide, -oxyhydroxide or -carbonate, with $M'=Ni_{1-x-y-z}Mn_xCo_yA_z$ with $x>0$, $y>0$, $0.70 \leq 1-x-y-z \leq 0.95$ and $0 \leq z < 0.1$, the precursor comprising having a core comprising a metal-bearing compound $M'_c$ and a shell comprising a metal-bearing compound $M'_s$, wherein $M'_c=Ni_{1-xc-yc-zc}Mn_{xc}Co_{yc}A_{zc}$ with $0<xc\leq0.2$, $0<yc\leq0.2$, $0\leq zc<0.1$ and $0.75\leq 1-x-y-z\leq 0.95$, and $M'_s=Ni_{1-xs-ys-zs}Mn_{xs}Co_{ys}A_{zs}$ with $0<xs\leq0.25$, $0.75<ys\leq0.95$, $0\leq zs<0.1$ and $0\leq_{1-xs-ys-zs}\leq0.10$.

7 Claims, 3 Drawing Sheets

PRECURSOR OF A POSITIVE ELECTRODE MATERIAL FOR A RECHARGEABLE LITHIUM-ION BATTERY

CROSS-REFERENCE TO RELATED APPLICATIONS

This application is a U.S. National Stage application of International Patent Application No. PCT/EP2019/078860, filed on Oct. 23, 2019, which claims the benefit of European Patent Application No. 18202213.7, filed on Oct. 24, 2018.

TECHNICAL FIELD AND BACKGROUND

The present invention relates to a metal bearing precursor which is applicable as a precursor of positive electrode materials in rechargeable lithium-ion batteries. Specifically, the precursor compound has a core-shell structure with a difference in cobalt concentration between the core and the shell.

The growing demand for portable electronic devices and the promising development in the electric vehicle industry inevitably require the proper power source. Hitherto, a lithium-ion battery (LIB) is the best electricity supplier for the aforementioned needs due to its high energy and power density. Commercially available LIBs in portable electronic devices typically consist of a graphite-based negative electrode and lithium cobalt oxide (LCO) as the most popular positive electrode material. However, despite its good performance reputation, LCO is facing some major limitations such as a low thermal stability and a recent skyrocketing price of cobalt (Co).

One of the attractive alternatives to lessen the dependency of LCO as positive electrode material is lithium nickel manganese cobalt oxide (NMC), which is derived from LCO itself. Adopting the structure of LCO, NMC compositions are generally written as LiM'O$_2$ where M'=Ni$_{1-x-y}$Mn$_x$Co$_y$. By the partial replacement of Co with nickel (Ni) and manganese (Mn), a good performance, lower price, as well as the possibility to reach a higher thermal stability can be achieved.

Among the many possible composition ratios of NMC, Ni-rich material is found to generate a higher reversible capacity comparing to others. For example, NMC811 (M'=Ni$_{0.8}$Mn$_{0.1}$Co$_{0.1}$) has around 30% more capacity than NMC111 (M'=Ni$_{1/3}$Mn$_{1/3}$Co$_{1/3}$).

In the framework of the present invention, a Ni-rich NMC compound or material is a LiM'O$_2$ cathode material wherein the molar content of Ni is of at least 0.70 mol.

The Ni-rich approach also reduces the price of the material since Ni and Mn prices are relatively lower and steadier compared to Co. The drawbacks, however, also stem from the high Ni presence.

Ni-rich NMCs are not stable in an air atmosphere comprising carbon dioxide and moisture. Therefore, extra steps for processing are required, leading an increase of production cost. Furthermore, Manthiram, et al., in "Energy Storage Materials Journal", January 2017, p. 125-139, explain that particles of Ni-rich layered materials are degraded due to particle cracks created by a volume change during charge and discharge in a battery. This volume change tends to be more severe for a higher Ni content in the structure.

By comprehending the high concentration of Ni as the cause of instability, addition of an outer layer with a different composition emerged as an approach to safely apply high Ni materials as a positive electrode material. Various methods and materials can be used to produce such layer, for example conventional carbon coating, metal particle coating, and creation of concentration gradient from the surface to the core of each individual particle. The outer layer—or the exterior shell—protects the core from the outside environment, while maintaining its structural integrity.

For example, US 2018/233740 (or US'740) discloses a positive electrode active material for a lithium secondary battery made from a precursor having core-shell structure comprising: a core composed of lithium transition metal oxides including nickel, manganese and cobalt; and a Co-based shell including transition metal oxides. In US'740, the cathode material made retains the core-shell structure of the precursor. Said cathode material has a NMC core and a Co-based shell composed of lithium transition metal oxides including cobalt.

The invention aims at providing a Ni-rich NMC precursor (i.e. a precursor comprising at least 0.70 mol of Ni) which can be converted at low temperature (e.g. at a temperature of less than 800° C.) into a lithiated Ni-rich NMC compound having increased electrochemical performances compared to the NMC cathode material obtained from the precursor according to the prior art.

SUMMARY

This objective is achieved by providing a precursor compound for manufacturing a lithium transition metal based oxide powder usable as an active positive electrode material in lithium-ion batteries according to claim 1, the precursor being either one of a metal-bearing M'-hydroxide, -oxyhydroxide or -carbonate, with M'=Ni$_{1-x-y-z}$Mn$_x$Co$_y$A$_z$ with x>0, y>0, 0.70≤1-x-y-z≤0.95 and 0≤z<0.1, the precursor comprising having a core comprising a metal-bearing compound M'$_c$ and a shell comprising a metal-bearing compound M'$_s$, wherein M'$_c$=Ni$_{1-xc-yc-zc}$Mn$_{xc}$Co$_{yc}$A$_{zc}$ with 0<xc≤0.2, 0<yc≤0.2, 0≤zc<0.1 and 0.75≤1-x-y-z≤0.95, and M'$_s$=Ni$_{1-xs-ys-zs}$Mn$_{xs}$Co$_{ys}$A$_{zs}$ with 0<xs≤0.25, 0.75<ys≤0.95, 0≤zs<0.1 and 0≤1-xs-ys-zs≤0.10.

It is indeed observed that an improved first cycle efficiency ($E_F$) of above 94%, as illustrated in the results provided in Table 3 and Table 4 is achieved with a battery using a positive electrode active material powder according to EX1 or EX2, manufactured from a precursor having the following features:
- a core having a composition: Ni$_{0.8}$Mn$_{0.1}$Co$_{0.1}$; and
- a shell having a composition: Mn$_{0.1}$Co$_{0.9}$ (EX1) or Mn$_{0.05}$Co$_{0.95}$ (EX2), the above-mentioned precursors, according to EX1 and EX2 are sintered at low temperature (from 700° C. to 780° C.) in presence of a lithium source so as to be converted into the cathode active materials of EX1 and EX2.

The values of $E_F$ measured for the cathode materials made from EX1 or EX2 are superior to that of the cathode material made from CEX4 (CEX4-P3, $E_F$ of 91%), having no Mn content in the shell. CEX4 is a precursor equivalent to the one disclosed in US'740. Although CEX4 is converted into a cathode material with the same T° C. range of EX1 or EX2 conversion, still the cathode material obtained from CEX4 has poorer EC performances (DQ1 and $E_F$), which are not expected to be better if CEX4 is converted into a cathode material at higher temperature. Hence, contrary to the teaching of US'740, the presence of Mn in the shell of a core-shell precursor according to claim 1 leads to an improvement of the EC performances of the cathode material made of said precursor.

The first cycle efficiency of the positive electrode material is an important parameter. The lower first cycle efficiency value between a positive electrode material and a negative electrode material decides the specific capacity of a battery. The efficiency of the negative electrode material is generally 92~94%, which is generally higher than that of most of NMC type positive electrode materials. Therefore, it is desirable that the first cycle efficiency of a positive electrode material is more than 92%, preferable more than 94%.

Positive electrode material with a higher discharge capacity is greatly desired since capacity represents the amount of energy that can be extracted from the battery. The first discharge capacity of a positive electrode material is preferably higher than 196 mAh/g as obtained by the analytical method of the present invention.

It is also observed that a positive electrode material prepared from the precursor according to the present invention has a better heat resistance.

DSC analysis is a good tool to evaluate the safety of positive electrode materials. It is observed that the cathode materials (EX1-P1 and EX1-P3) made from EX1 allows to achieve the desired level of safety.

The present invention concerns the following embodiments:

Embodiment 1

Viewed from a first aspect, the invention can provide a precursor compound for manufacturing a lithium transition metal based oxide powder usable as an active positive electrode material in lithium-ion batteries, the precursor being either one of a metal-bearing M'-hydroxide, -oxyhydroxide or -carbonate, with M'=$Ni_{1-x-y-z}Mn_xCo_yA_z$ with x>0, y>0, 0.70≤1-x-y-z≤0.95 and 0≤x≤0.1, the precursor comprising having a core comprising a metal-bearing compound $M'_c$ and a shell comprising a metal-bearing compound $M'_s$, wherein $M'_c=Ni_{1-xc-yc-zc}Mn_{xc}Co_{yc}A_{zc}$ with 0<xc≤0.2, 0<yc≤0.2, 0≤zc<0.1 and 0.75≤1-x-y-z≤0.95, and $M'_s$= $Ni_{1-xs-ys-zs}Mn_{xs}Co_{ys}A_{zs}$ with 0<xs≤0.25, 0.75<ys≤0.95, 0≤zs<0.1 and 0≤1-xs-ys-zs≤0.10.

Embodiment 2

In a second embodiment according to Embodiment 1, 1-xs-ys-zs=0.

Embodiment 3

In a third embodiment according to Embodiment 1 or 2, 0.05≤xs≤0.25.

Embodiment 4

In a fourth embodiment according to Embodiment 1 or 2, 0<xs≤0.15

Embodiment 5

In a fifth embodiment according to Embodiment 1 or 2, 0.05≤xs≤0.15

Embodiment 6

In a sixth embodiment according to Embodiment 1 or 2, the precursor is a M'-hydroxide or -oxyhydroxide, wherein 0.05<xc<0.15, 0.05<yc<0.15, zc=0 and 0.75<1-x-y-z<0.85, and wherein 0.05<xs<0.15, 0.85<ys<0.95 and zs=0.

Embodiment 7

In a seventh embodiment according to any of the Embodiments 1 to 6, the precursor compound has an average radius R, and the shell has an average thickness $T_S$, with $T_S$ being between 0.5 and 5% of R. In the different embodiments, A may be either one or more of Ti, Mg, W, Zr, Cr, V and Al.

Viewed from a second aspect, the invention can provide the use of the precursor compound according to any of the Embodiments 1 to 7 in the manufacturing of a lithium transition metal-based oxide powder usable as an active positive electrode material in lithium-ion batteries.

Viewed from a third aspect, the invention can provide a method for manufacturing a lithium transition metal-based oxide powder usable as an active positive electrode material in lithium-ion batteries comprising the steps of:

providing the precursor compound according to any of the Embodiments 1 to 7, mixing the precursor compound with LiOH, and sintering the mixture at a temperature superior or equal to 680° C. and inferior or equal to 800° C., preferably at a temperature inferior or equal to 780° C.

In this method the step of providing a precursor compound according to the invention may comprise the substeps of:

providing a first aqueous solution comprising $M'_cSO_4$, NaOH and $NH_3$, wherein the content of $OH^-$ ions is at least twice the content of $M'_c$ ions, precipitating $M'_c(OH)_2$ as a core material, providing a second aqueous solution comprising the precipitated $M'_c(OH)_2$, $M'_sSO_4$, NaOH and $NH_3$, thereby precipitating the precursor compound according to the invention comprising the $M'_c(OH)_2$ core material and a shell material comprising $M'_s$.

In this process it could also be that the precipitated $M'_c(OH)_2$ is transferred to a second aqueous solution comprising $M'_sSO_4$, NaOH and $NH_3$, thereby precipitating a shell material comprising $M'_s$ on the $M'_c(OH)_2$ core material.

DETAILED DESCRIPTION

Figure 1:
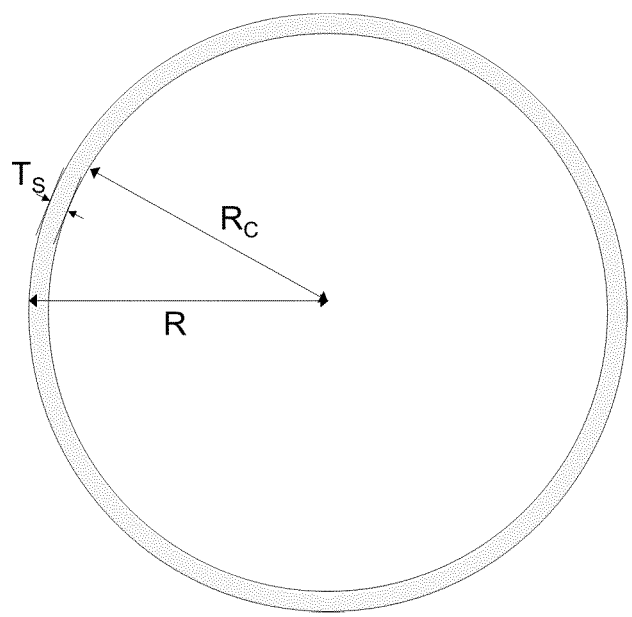
FIG. 1. Schematic drawing of core-shell particle

In the following detailed description, preferred embodiments are described in detail to enable practice of the invention. Although the invention is described with reference to these specific preferred embodiments, it will be understood that the invention is not limited to these preferred embodiments. To the contrary, the invention includes numerous alternatives, modifications and equivalents as will become apparent from consideration of the following detailed description.

Ni-rich NMC compounds prepared from the metal bearing precursors according to the invention have an improved first cycle efficiency, cycle stability and thermal stability which promote a higher level of safety. This is achieved by taking a synergetic advantage of the core-shell concept of the metal bearing precursor and high overall Ni content in the metal bearing precursor.

In this technical field, metal bearing precursors generally take the form of a hydroxide ($M'(OH)_2$), oxyhydroxide ($M'O_a(OH)_{(2-a)}$ with 0<=a<=1), or carbonate ($M'CO_3$), but are not limited to these forms. The metal (M') comprises either Ni and Co or Ni, Co and Mn. The metal bearing precursor may contain dopants. The dopant (A) may be either one or more of the following elements: Ti, Mg, W, Zr, Cr, V and Al. Therefore, the formula can be M'= $Ni_{1-x-y-z}Mn_xCo_yA_z$. The molar ratio of Ni over M' (1-x-y-z) in the overall precursor may be at least 0.70 and at most 0.95. In a normal production process, the molar ratio amongst the metals in the metal bearing precursor is found back in the final positive electrode material. If the Ni/M' is lower than 0.70, the capacity benefit of the positive electrode material is limited. If the Ni/M' is higher than 0.95, not only the preparation of a high-quality metal bearing precursor is difficult, but also the preparation of the positive electrode material with high quality is extremely difficult. The dopants can contribute to an improvement of the performance and safety of a battery containing the positive electrode material prepared from the metal bearing precursor.

A particle of the metal bearing precursor comprises a core and a shell, both having different molar ratios among the metals, wherein lies the key of this invention. The metal composition of the core is defined by the formula $M_c'=Ni_{1-xc-yc-zc}Mn_{xc}Co_{yc}A_{zc}$. The metal composition of metal in the shell is defined by the formula $M_s'=Ni_{1-xs-ys-zs}Mn_{xs}Co_{ys}A_{zs}$. Since the volume of the core is bigger than that of the shell in this invention, $M_c'$ mainly determines the overall composition (M'). The Ni content in the core (1-xc-yc-zc) may be at least 0.75 to obtain the high Ni content (1-x-y-z) in the overall particle. The Co content in the shell (ys) may be at least 0.75. The Ni content (1-xs-ys-zs) in the shell may be at most 0.10 but is preferably zero. The Mn content (xs) in the shell may be between 0.05 and 0.1. The high fraction of Co in the shell acts as a reinforcing layer to improve rate capability and provide additional capacity, while the small fraction of Mn is needed to stabilize a highly delithiated state structure.

The average thickness of the shell part ($T_S$) is defined as the difference between the average radius of a particle (R) and the average radius of the core part ($R_C$) as shown FIG. 1. $T_S$ may be at least R×0.005 (0.5% of R) and at most R×0.05 (5% of R). For example, if the average particle size (diameter) of the metal bearing precursor is 10 µm, the range of $T_S$ may be from 25 nm to 250 nm. If $T_S$ is higher than 5% of R, the contribution of the shell part in the overall composition becomes too high, leading to a lower Ni content (1-x-y-z) in the precursor since the shell part comprises a limited amount of Ni. If $T_S$ is lower than 0.5% of R, the benefit of the invention is limited.

The abovementioned metal bearing precursor can be prepared by several different methods. A co-precipitation process described in KR101547972 is one of the possible processes to produce the core-shell metal bearing precursor. The method is excellent to prepare homogeneous spherical precursor particles at large scale. The core part which has a high Ni content is firstly precipitated in a continuously stirred tank reactor. Then, the precipitated slurry or powder from the first precipitation process is used as seeds of the second precipitation process to prepare the Co-rich shell on the Ni-rich core. Since there is no high temperature treatment in this process, the composition of the core and shell should be discrete, and no metal content gradient is formed at the interface core/shell. Dry/wet coating processes are also possible processes. The precipitated Ni-rich metal bearing precursor may further be coated by Co-rich nano-powders or solutions.

The following analysis methods are used in the Examples:

A) Particle Size Distribution (PSD) Analysis

The PSD is measured using a Malvern Mastersizer 3000 with Hydro MV wet dispersion accessory after dispersing the powder in an aqueous medium. To improve the dispersion of the powder, sufficient ultrasonic irradiation and stirring is applied, and an appropriate surfactant is introduced. D10, D50 and D90 are defined as the particle size at 10%, 50% and 90% of the cumulative volume % distribution. The span is defined as (D90-D10)/D50.

B) Inductively Coupled Plasma (ICP) Analysis

The composition of NMC products in this description is measured by the inductively coupled plasma (ICP) method using an Agilent ICP 720-ES. 1 g of powder sample is dissolved into 50 mL high purity hydrochloric acid in an Erlenmeyer flask. The flask is covered by a watch glass and heated on a hot plate at 380° C. until complete dissolution of the precursor. After being cooled to room temperature, the solution and the rinsing water of Erlenmeyer flask are transferred to a 250 mL volumetric flask. Afterwards, the volumetric flask is filled with DI water up to the 250 mL mark, followed by complete homogenization. An appropriate amount of solution is taken out by pipette and transferred into a 250 mL volumetric flask for the $2^{nd}$ dilution, where the volumetric flask is filled with internal standard and 10% hydrochloric acid up to the 250 mL mark and then homogenized. Finally, this solution is used for ICP measurement.

C) Coin Cell Testing

For the preparation of a positive electrode, a slurry that contains electrochemical active material, conductor (Super P, Timcal) and binder (KF#9305, Kureha)—with a formulation of 90:5:5 by weight—in a solvent (NMP, Mitsubishi) is prepared using a high-speed homogenizer. The homogenized slurry is spread on one side of an aluminum foil using a doctor blade coater with a 230 µm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as a negative electrode. 1M $LiPF_6$ in EC/DMC (1:2) is used as electrolyte and is dropped between separator and electrodes. Then, the coin cell is completely sealed to prevent leakage of the electrolyte.

Each cell is cycled at 25° C. using Toscat-3100 computer-controlled galvanostatic cycling stations (from Toyo). The coin cell testing schedule used to evaluate samples is detailed in Table 1. The schedules use a 1 C current definition of 160 mA/g and comprise the evaluation of rate performance at 0.1 C in the 4.3~3.0V/Li metal window range. The initial charge capacity CQ1 and discharge capacity DQ1 are measured in constant current mode (CC). The first cycle efficiency ($E_F$) is expressed in % as:

$$E_F = \frac{DQ1}{CQ1} \times 100(\%)$$

TABLE 1

Coin cell testing schedule

| | Charge | | | | Discharge | | | |
|---|---|---|---|---|---|---|---|---|
| Cycle No | C Rate | End current | Rest (min) | V/Li metal (V) | C Rate | End current | Rest (min) | V/Li metal (V) |
| 1 | 0.10 | — | 30 | 4.3 | 0.10 | — | 30 | 3.0 |

D) Full Cell Testing 650 mAh pouch-type cells are prepared as follows: the positive electrode active material powder is prepared as described above, Super-P (Super-PTM Li commercially available from Timcal), and graphite (KS-6 commercially available from Timcal) as positive electrode conductive agents and polyvinylidene fluoride (PVDF 1710 commercially available from Kureha) as a positive electrode binder are added to NMP (N-methyl-2-pyrrolidone) as a dispersion medium so that the mass ratio of the positive electrode active material powder, the positive electrode conductive agent, and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm-thick aluminum foil. The width and the length of the applied area is 43 mm and 450 mm, respectively. Typical cathode active material loading weight is 13.9 mg/cm$^2$. The electrode is then dried and calendared using a pressure of 100 Kgf. Typical electrode density is 3.2 g/cm$^3$. In addition, an aluminum plate serving as a positive electrode current collector tab is arc-welded to an end portion of the positive electrode.

Commercially available negative electrodes are used. In short, a mixture of graphite, CMC (carboxy-methyl-cellulose-sodium) and SBR (styrenebutadiene-rubber), in a mass ratio of 96/2/2, is applied on both sides of a copper foil. A Ni plate serving as a negative electrode current collector tab is arc-welded to an end portion of the negative electrode. Typical cathode and anode discharge capacity ratio used for cell balancing is 0.75. Non-aqueous electrolyte is obtained by dissolving lithium hexafluorophosphate (LiPF$_6$) salt at a concentration of 1.0 mol/L in a mixed solvent of EC (ethylene carbonate) and DEC (diethyl carbonate) in a volume ratio of 1:2.

A sheet of the positive electrode, a sheet of the negative electrode, and a sheet of separator made of a 20 μm-thick microporous polymer film (Celgard® 2320 commercially available from Celgard) interposed between them are spirally wound using a winding core rod to obtain a spirally-wound electrode assembly. The wounded electrode assembly and the electrolyte are then put in an aluminum laminated pouch in an air-dry room with dew point of −50° C., so that a flat pouch-type lithium secondary battery is prepared. The design capacity of the secondary battery is 650 mAh when charged to 4.20V.

The non-aqueous electrolyte solution is impregnated for 8 hours at room temperature. The battery is pre-charged at 15% of its theoretical capacity and aged 1 day, also at room temperature. The battery is then degassed for 30 seconds, and the aluminum pouch is sealed. The battery is prepared for use as follows: the battery is charged using a current of 0.2 C (with 1 C=650 mA) in CC mode (constant current) up to 4.2V then CV mode (constant voltage) until a cut-off current of C/20 is reached, before being discharged in CC mode at 0.5 C rate down to a cut-off voltage of 2.7V.

The lithium secondary full cell batteries are charged and discharged several times under the following conditions, both at 25° C. and 45° C., to determine their charge-discharge cycle performance:

- a charge is performed in CC mode under 1 C rate up to 4.2V, then CV mode until C/20 is reached,
- the cell is then set to rest for 10 minutes,
- a discharge is performed in CC mode at 1 C rate down to 2.7V,
- the cell is again set to rest for 10 minutes, after which
- charge-discharge cycles proceed until the battery reaches 80% retained capacity. Every 100 cycles, a discharge is performed at 0.2 C rate in CC mode down to 2.7 V.

E) Differential Scanning Calorimetry (DSC)

Small coin cell electrodes containing about 3.3 mg of active material are punched and assembled in coin cells. Coin cells are charged to 4.3V using a C/24 charge rate (1 C=175 mAh/g) followed by a constant voltage soak for at least an hour. After disassembly of the coin cells electrodes are repeatedly washed in DMC to remove remaining electrolyte. After evaporating the DMC the electrodes are immersed into stainless steel cans and about 1.2 mg of PVDF based electrolyte is added, following by hermetic closing (crimping) of the cells. The DSC measurement is performed using a TA instrument DSC Q10 device. The DSC scan is performed from 50° C. to 350° C. using a heat rate of 5K/min. DSC cells and crimping equipment were also supplied by TA.

The invention is further illustrated in the following examples:

Example 1

The precipitation processes are performed in a reactor with a liquid volume of 10 L using an overflow tube and an impeller motor of 400 W. The impeller of 10 cm diameter is stirred at 800 RPM. The reactor has 4 baffles to allow vigorous stirring. A flow of 50 L/h of nitrogen gas is applied above the liquid level to avoid oxidation due to the vigorous stirring. Three solutions containing nickel, manganese, and cobalt sulfate (NiSO$_4$, MnSO$_4$, CoSO$_4$) with a total concentration of 110 g/L metal are prepared to yield a mixed MeSO$_4$ solution, wherein Me consists of Ni, Mn, and Co. The first solution has a Ni:Mn:Co molar ratio of 0.8:0.1:0.1, the second solution has a molar ratio of 0.0:0.1:0.9 and the third solution has a molar ratio of 1/3:1/3:1/3. A solution of 400 g/L NaOH and an undiluted ammonia solution of 25% are used.

A sample EX1 having a formula Ni$_{0.74}$Mn$_{0.09}$Co$_{0.17}$O$_{0.27}$(OH)$_{1.73}$ is prepared in a multiple step process:

S1-Seed Preparation:

A Ni$_{0.8}$Mn$_{0.1}$Co$_{0.1}$(OH)$_2$ seed precursor is prepared using a typical co-precipitation in a Continuous Stirred Tank Reactor (CSTR), having a specific residence time of 6 hours. The seed precursor composition can also be different as the seeds will only be a minor part of the final particle and as such do not impact its composition. At the start the reactor is filled with water and ammonia to get a 15 g/L of ammonia solution inside. The temperature in the reactor is 60° C. After the reactor is filled with the starting solution, the different reagents (MeSO$_4$ solution, NaOH solution, NH$_3$ solution) are pumped simultaneously in the reactor at different injection points, keeping the ammonia to metal ratio of 1:1 and keeping the pH around 11.7. There should be more than 2 OH$^-$ ions for each metal ion in the solution during the precipitation reaction. After 24 hours, the reactor is in steady state and the D50 is between 5 and 20 μm, and the slurry from the overflow is collected. The precipitated metal hydroxides are washed, filtered under a protective atmosphere to remove the dissolved salts and ammonia. 200 g of the wet cake is re-pulped in 1 L water and treated with a mechanical pulverization by ball mill. This treatment reduces the D50 size to less than 2 μm.

S2-Precipitation of the Core Particles:

A Ni$_{0.8}$Mn$_{0.1}$Co$_{0.1}$(OH)$_2$ core precursor is prepared using a modified co-precipitation in a Continuous Stirred Tank Reactor (CSTR), having a specific or average residence time of 3 hours. The 8:1:1 MeSO$_4$ solution composition is used. At the start the reactor is filled with water and ammonia to get a 15 g/L of ammonia solution inside. The temperature in the reactor is 60° C. After the reactor is filled with the starting solution, different reagents (MeSO$_4$ solution, NaOH solution, NH$_3$ solution) are pumped simultaneously in the reactor at different injection points, keeping the ammonia to metal ratio of 1:1 and keeping the pH around 11.7 with the NaOH solution. There should be more than 2 OH$^-$ ions for each metal ion in the solution. After 6 hours, 100 g of seeds from S1 are added to the reactor. The (particle size) span in the reactor immediately becomes large and the D50 becomes small. After at least 6 hours the span decreases steadily to a value below 0.9. At this point the particles have grown to around 6-11 μm. The slurry in the overflow is now collected in a beaker of 3 L and the particles are allowed to settle in the beaker. The beaker is decanted each 30 minutes, and the slurry is put back into the reactor. The dosing of the reagents is stopped when the particles reach a sufficient size (around 11 μm).

S3-Precipitation of the Shell:

The metal sulfate solution (MeSO$_4$) dosed to the reactor in S2 is switched to the second MeSO$_4$ (this time with Me=Mn$_{0.1}$Co$_{0.9}$) solution. The dosing of all chemicals is re-started, and the overflow is collected in a 3 L beaker. Every 30 min the beaker is decanted to remove filtrate and the slurry is put back into the reactor. This practice is continued until the shell with the desired thickness is grown using this procedure. The precipitated metal (oxy-)hydroxides are washed, filtered under protective atmosphere to remove the dissolved salts and ammonia. The wet cake is dried in a furnace at 150° C. under nitrogen. The final core-shell precipitated metal (oxy-)hydroxide is labeled EX1. The average metal composition of EX1 from ICP analysis is Ni:Mn:Co=73.8:9.5:16.7 (in mol %) as shown in Table 2. Important factors like pH, stirring rate, chemical concentration, and temperature are delicately controlled during precipitation process to maintain a constant final product composition. The thickness of the shell can be calculated based on the process conditions, but also measured afterwards using advanced analysis instruments such as XPS depth profiling or even TEM.

TABLE 2

Core-shell composition (mol %) and calculated shell thickness (μm) of the example and comparative example materials

| | Ni:Mn:Co composition (mol %) | | | Calculated thickness of shell (μm) |
| --- | --- | --- | --- | --- |
| | Designed | | | |
| Sample ID | Core | Shell | ICP | |
| EX1 | 80:10:10 | 0:10:90 | 73.8:9.5:16.7 | 0.15 |
| EX2 | 80:10:10 | 0:5:95 | 73.5:9.5:17.1 | 0.21 |
| CEX2 | 80:10:10 | 33.3:33.3:33.3 | 76.1:11.6:12.4 | 0.17 |
| CEX3 | 80:10:10 | 80:10:10 | 79.8:9.8:10.4 | 0.00 |
| CEX4 | 80:10:10 | 0:0:100 | 73.1:9.0:17.9 | 0.21 |

Preparation of Positive Electrode Materials

Positive electrode materials are obtained by blending EX1 with a lithium source followed by sintering at a temperature varying from 700° C. to 820° C. LiOH is selected as lithium source and the blending is designed to have a Li to metal mol ratio (Li/M') of 1.00. 30 g of this blend is sintered in a crucible at three different temperatures (700° C., 740° C., 780° C., and 820° C.). The sintering at the target temperature is performed under an oxygen atmosphere for 12 hours. The sintered agglomerated compounds are crushed and sieved. The prepared positive electrode materials are labeled EX1-P1, EX1-P2, EX1-P3, and CEX1-P4, respectively. Table 3 shows the electrochemical performance of the positive electrode materials in the above described coin cell test.

TABLE 3

Electrochemical properties of positive electrode materials in Example 1 and Comparative Example 1

| | Sintering temperature (° C.) | Coin cell | | |
| --- | --- | --- | --- | --- |
| Sample ID | | CQ1 (mAh/g) | DQ1 (mAh/g) | $E_F$ (%) |
| EX1-P1 | 700 | 208.8 | 196.7 | 94.2 |
| EX1-P2 | 740 | 211.2 | 197.1 | 93.3 |
| EX1-P3 | 780 | 214.0 | 201.3 | 94.1 |
| CEX1-P4 | 820 | 213.9 | 194.8 | 91.1 |

In this Table 3, it demonstrated that a cathode material made from a precursor according to the invention which is sintered at a temperature of 680° C. and of less than 800° C. has the highest $E_F$ values.

Example 2

EX2 having the formula Ni$_{0.73}$Mn$_{0.09}$Co$_{0.17}$O$_{0.24}$(OH)$_{1.76}$ is prepared by the same procedure as described in EX1 except that the third MeSO$_4$ solution (Me=Mn$_{0.05}$Co$_{0.95}$) solution is used in the S3 step instead of the second MeSO$_4$ solution. The average metal composition of the final core shell precipitate EX2 from ICP analysis is Ni:Mn:Co=73.5:9.5:17.1 (in mol %) as shown in Table 2. The positive electrode materials EX2-P1 are prepared by the same procedure as EX1-P1, except that EX2 is used as the metal bearing compound instead of EX1. Table 4 shows the electrochemical performance of the positive electrode materials in the above described coin cell test.

TABLE 4

Electrochemical properties of positive electrode materials in Comparative Example 3

| | Sintering temperature (° C.) | Coin cell | | |
| --- | --- | --- | --- | --- |
| Sample ID | | CQ1 (mAh/g) | DQ1 (mAh/g) | $E_F$ (%) |
| EX2-P1 | 700 | 205.8 | 195.9 | 95.2 |

The results provided in Table 4 confirms that a high $E_F$ value is achieved for a cathode material made from EX2 at a sintering temperature of 680° C. and of less than 800° C.

Comparative Example 2

CEX2 having the formula Ni$_{0.76}$Mn$_{0.12}$Co$_{0.12}$O$_{0.27}$(OH)$_{1.73}$ is prepared by the same procedure as described in EX1 except that the fourth MeSO$_4$ solution (Me=Ni$_{1/3}$Mn$_{1/3}$Co$_{1/3}$) is used in the S3 step instead of the second MeSO$_4$ solution. The average metal composition of the final core shell precipitate CEX2 from ICP analysis is Ni:Mn:Co=76.1:11.6:12.4 (in mol %) as shown in Table 2. The positive electrode materials CEX2-P1, CEX2-P2, CEX2-P3, and CEX2-P4 are prepared by the same procedure as EX1-P1, EX1-P2, EX1-P3, and CEX1-P4, respectively, except that CEX2 is used as the metal bearing compound instead of EX1. Table 5 shows the electrochemical performance of the positive electrode materials in the above described coin cell test.

TABLE 5

Electrochemical properties of positive electrode materials in Comparative Example 1

| Sample ID | Sintering temperature (° C.) | Coin cell CQ1 (mAh/g) | DQ1 (mAh/g) | $E_F$ (%) |
|---|---|---|---|---|
| CEX2-P1 | 700 | 208.9 | 189.9 | 90.9 |
| CEX2-P2 | 740 | 212.4 | 192.7 | 90.7 |
| CEX2-P3 | 780 | 217.0 | 196.8 | 90.7 |
| CEX2-P4 | 820 | 217.0 | 194.6 | 89.6 |

Comparative Example 3

CEX3 having the formula $Ni_{0.8}Mn_{0.1}Co_{0.1}O_{0.25}(OH)_{1.75}$ is prepared by the same procedure as described in EX1 except that the precipitation of the shell in the S3 step is skipped. The average metal composition of the precipitate CEX3 is Ni:Mn:Co=79.8:9.8:10.4 (in mol %) as shown in Table 2. The positive electrode materials CEX3-P1, CEX3-P2, CEX3-P3, and CEX3-P4 are prepared by the same procedure as EX1-P1, EX1-P2, EX1-P3, and CEX1-P4, respectively, except that CEX3 is used as the metal bearing compound instead of EX1.

A surface modified positive electrode material CEX3-P3-A is prepared by the following procedure. 1000 g of CEX3-P3 is mixed with 37 g of fine $(Co_{0.97}Mn_{0.03})_3O_4$ and 17 g of LiOH.H$_2$O. The mixture is heated in a chamber furnace at 800° C. for 10 hours with an oxygen flow rate of 10 L per minute. The heated compound is sieved and labeled CEX3-P3-A and has the formula $LiNi_{0.77}Mn_{0.13}Co_{0.10}O_2$. CEX3-P3-B having the formula $LiNi_{0.75}Mn_{0.10}Co_{0.15}O_2$ is prepared by the same procedure as CEX3-P3-A except that 56 g of fine $(Co_{0.97}Mn_{0.03})_3O_4$ and 26 g of LiOH.H$_2$O are mixed with CEX3-P3. Table 6 shows the electrochemical performance of the positive electrode materials in the above described coin cell test.

TABLE 6

Electrochemical properties of positive electrode materials in Comparative Example 2

| Sample ID | Sintering temperature (° C.) | Coin cell CQ1 (mAh/g) | DQ1 (mAh/g) | $E_F$ (%) |
|---|---|---|---|---|
| CEX3-P1 | 700 | 216.3 | 196.1 | 90.7 |
| CEX3-P2 | 740 | 221.1 | 200.4 | 90.6 |
| CEX3-P3 | 780 | 223.5 | 200.6 | 89.8 |
| CEX3-P4 | 820 | 225.7 | 200.8 | 89.0 |
| CEX3-P3-A | n/a* | 220.7 | 194.5 | 88.1 |
| CEX3-P3-B | n/a* | 219.2 | 193.2 | 88.1 |

*CEX3-P3-A&B are made from a different manufacturing process than the process employed for CEX3-P1 to 4. CEX3-P3-A&B results from a two-step treatment of CEX3: a first heating during lithiation (at 780° C.) followed by a coating of $(Co_{0.97}Mn_{0.03})_3O_4$ and LiOH•H$_2$O (at 800° C.).

Figure 2:
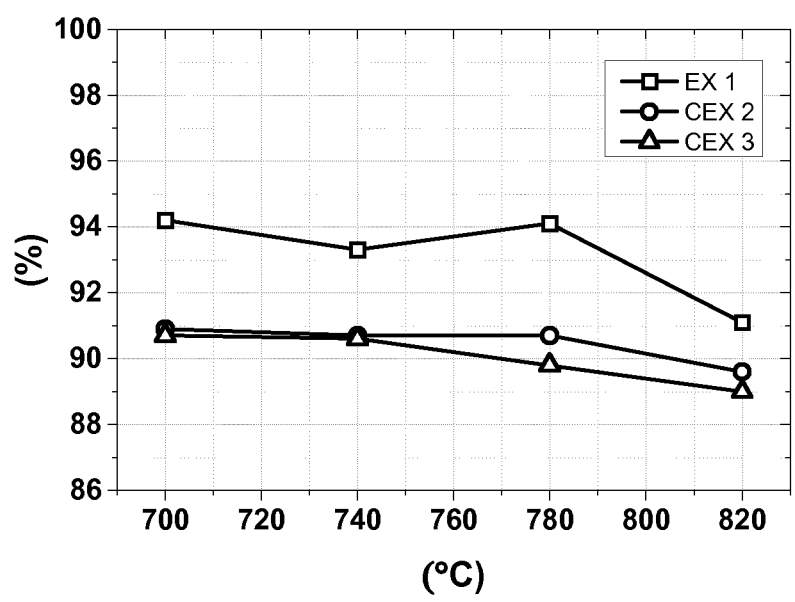
FIG. 2. Comparison of the first cycle efficiency performance for EX1, CEX2 and CEX3, prepared at different temperatures FIG. 3. Comparison of full cell cycle performance of EX1-P3, EX1-P4, CEX3-P3 and CEX3-P3-A at 25° C.

FIG. 2 shows the first cycle efficiency of positive electrode materials prepared by different metal bearing compounds. The positive electrode materials prepared by EX1 generally have a higher $E_F$ value than the other positive electrode materials at the corresponding sintering temperature. Among each example and comparative examples groups, the CEX1-P4, CEX2-P4, and CEX3-P4, which are the precursors sintered at 820° C. show the lowest $E_F$ value.

CEX3-P3-A and CEX3-P3-B, which are surface-modified compounds, also have a lower $E_F$ than the positive electrode materials prepared by EX1. It indicates that a normal surface coating process cannot provide the same superior electrochemical properties as the positive electrode materials prepared by the core-shell metal bearing technique in this invention, in spite of the similar Ni content.

Comparative Example 4

CEX4 having the formula $Ni_{0.73}Mn_{0.09}Co_{0.18}O_{0.15}(OH)_{1.85}$ is prepared by the same procedure as described in EX1 except that CoSO$_4$ solution is used in the S3 step instead of the second MeSO$_4$ solution. The average metal composition of the final core shell precipitate CEX4 from ICP analysis is Ni:Mn:Co=73.1:9.0:17.9 (in mol %) as shown in Table 2. The positive electrode materials CEX4-P3 are prepared by the same procedure as EX1-P3, except that CEX4 is used as the metal bearing compound instead of EX1. Table 7 shows the electrochemical performance of the positive electrode materials in the above described coin cell test.

TABLE 7

Electrochemical properties of positive electrode materials in Comparative Example 3

| Sample ID | Sintering temperature (° C.) | Coin cell CQ1 (mAh/g) | DQ1 (mAh/g) | $E_F$ (%) |
|---|---|---|---|---|
| CEX4-P3 | 780 | 211.7 | 193.2 | 91.3 |

CEX4-P3 is obtained from the precursor CEX4 without Mn content in the shell. $E_F$ value of CEX4-P3 (91.3%) is much lower than $E_F$ value of EX1-P3 (94.1%), which demonstrates the effect of the presence of Mn in the particle shell in the claimed content range.

Figure 3:
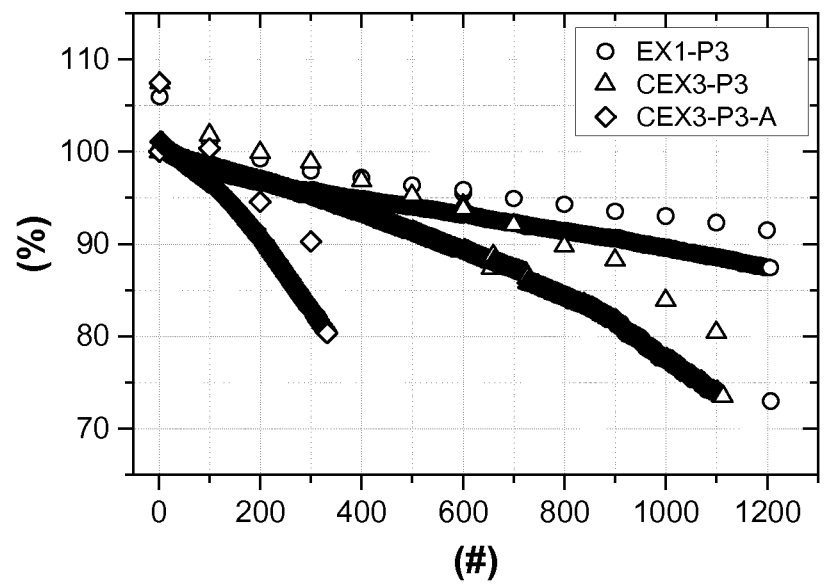
Figure 4:
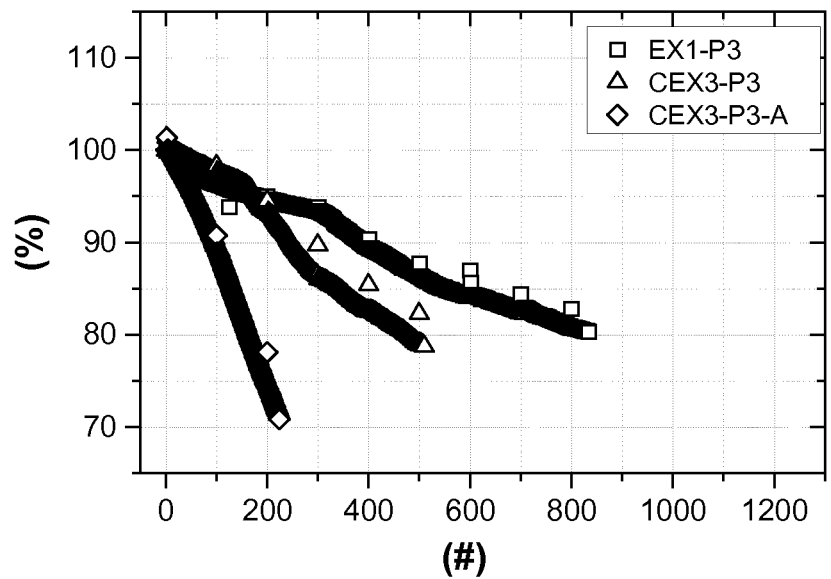
FIG. 4. Comparison of full cell cycle performance of EX1-P3, EX1-P4, CEX3-P3 and CEX3-P3-A at 45° C.

FIGS. 3 and 4 shows the full cell cycle performance of EX1-P3, CEX3-P3 and CEX3-P3-A at 25° C. and 45° C. respectively. The cycle life is defined as the number of charge-discharge cycles before the capacity degrades to or below 80%. The value of cycle life can be extrapolated through a linear line equation and is shown in Table 8. It is clear that EX1-P3 has the smallest gradient and reaches 80% of capacity after 1913 cycles at 25° C. The number is halved for CEX3-P3 to around 921 cycles and even lower for CEX3-P3-A (only 349 cycles). The same tendency is observed for both measurement temperatures. The result clearly displays a better cyclability of EX1-P3 compared to the comparative examples.

TABLE 8

Calculated cycle life of EX1-P3, CEX3-P3, and CEX3-P3-A

| Sample ID | Number of cycles at 80% of capacity | |
|---|---|---|
| | 25° C. | 45° C. |
| EX1-P3 | 1913 | 967 |
| CEX3-P3 | 921 | 440 |
| CEX3-P3-A | 349 | 154 |

Figure 5:
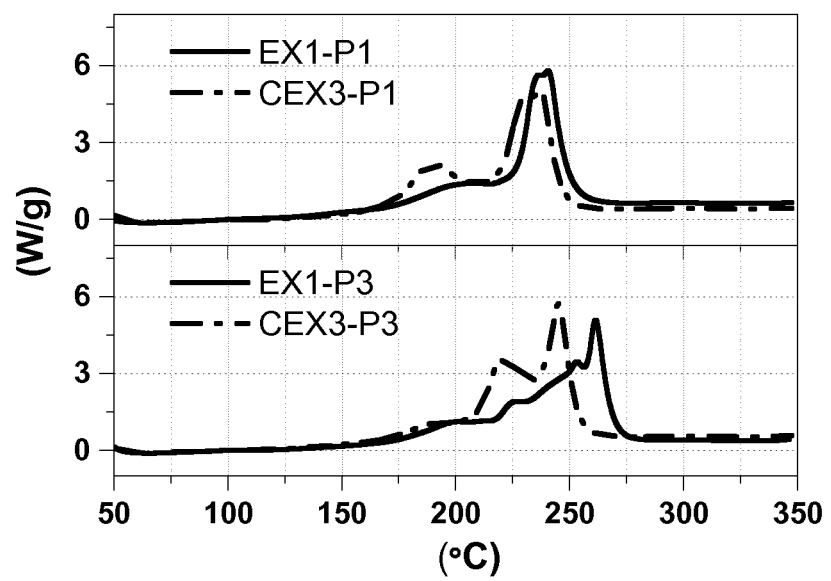
FIG. 5. DSC data of EX1-P1 and CEX3-P1 (top), and EX1-P3 and CEX3-P3 (bottom)

FIG. 5 shows the DSC analysis of the charged positive electrodes prepared with EX1-P1, CEX3-P1, EX1-P3 and CEX3-P3. The highest exothermic peak in each graph indicates the thermal decomposition of the positive electrode material, which is preferable to occur at a higher temperature. Thermal decomposition of EX1-P3 occurred at around 260° C., shifted about 15° C. from CEX3-P3 decomposition temperature (245° C.). The same tendency is observed for EX1-P1 and CEX2-P1.

The invention claimed is:

1. A precursor compound for manufacturing a lithium transition metal-based oxide powder usable as an active positive electrode material in lithium-ion batteries, the precursor being one of a metal-bearing M'-hydroxide, -oxyhydroxide or -carbonate, with M'=$Ni_{1-x-y-z}Mn_xCo_yA_z$ with x>0, y>0, 0.70≤1x-y-z≤0.95, 0≤z<0.1, and A comprising one or more of Ti, Mg, W, Zr, Cr, V or Al, and the precursor comprising a core comprising a metal-bearing compound $M'_c$ and
a shell comprising a metal-bearing compound $M'_s$,
wherein $M'_c$=$Ni_{1-xc-yc-zc}Mn_{xc}Co_{yc}A_{zc}$ with 0<xc≤0.2, 0<yc≤0.2, 0≤zc≤0.1 and 0.75≤1-xc-yc-zc≤0.95, and $M'_s$=$Ni_{1-xs-ys-zs}Mn_{xs}Co_{ys}A_{zs}$ with 0<xs≤0.25, 0.75<ys≤0.95, 0≤zs<0.1 and 0≤1-xs-ys-zs≤0.10.

2. The precursor compound of claim 1, wherein 0.05≤xs≤0.25.

3. The precursor compound of claim 1, wherein 1-xs-ys-zs=0.

4. The precursor compound of claim 1, wherein the precursor compound has an average radius R, and the shell has an average thickness $T_s$, with $T_s$ being between 0.5 and 5% of R.

5. The precursor compound of claim 1, wherein the precursor is a M'-hydroxide or -oxyhydroxide, wherein 0.05<xc<0.15, 0.05<yc<0.15, zc=0 and 0.75<1-x-y-z<0.85, and wherein 0.05<xs<0.15, 0.85<ys<0.95 and zs=0.

6. A method for manufacturing a lithium transition metal-based oxide powder usable as an active positive electrode material in lithium-ion batteries comprising:
providing a precursor compound according to claim 1,
mixing the precursor compound with LiOH, and
sintering the mixture at a temperature superior or equal to 680° C. and inferior or equal to 800° C.

7. The method according to claim 6, wherein the step of providing the precursor compound comprises:
providing a first aqueous solution comprising $M'_cSO_4$, NaOH and $NH_3$, wherein the content of $OH^-$ ions is at least twice the content of $M'_c$ ions,
precipitating $M'_c(OH)_2$ as a core material,
providing a second aqueous solution comprising the precipitated $M'_c(OH)_2$, $M'_sSO_4$, NaOH and $NH_3$, thereby precipitating the precursor compound comprising the $M'_c(OH)_2$ core material and a shell material comprising $M'_s$.

* * * * *